(12) United States Patent
Lagarde et al.

(10) Patent No.: US 11,041,393 B2
(45) Date of Patent: Jun. 22, 2021

(54) PART OF A TURBOMACHINE COMPRISING A WASHER COOPERATING WITH A COUNTERBORE

(71) Applicant: SAFRAN AIRCRAFT ENGINES, Paris (FR)

(72) Inventors: Romain Nicolas Lagarde, La Queue en Brie (FR); Marie-Charline Stephanie Charbonnier, Vert Saint Denis (FR); Jean-Marc Claude Perrollaz, Hericy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/433,984

(22) Filed: Jun. 6, 2019

(65) Prior Publication Data
US 2019/0376398 A1 Dec. 12, 2019

(30) Foreign Application Priority Data
Jun. 8, 2018 (FR) ...................................... 1855004

(51) Int. Cl.
*F01D 9/04* (2006.01)
*F01D 25/28* (2006.01)
(Continued)

(52) U.S. Cl.
CPC ............. *F01D 9/042* (2013.01); *F01D 25/28* (2013.01); *F16B 39/105* (2013.01);
(Continued)

(58) Field of Classification Search
CPC ........ F01D 9/042; F01D 25/28; F01D 25/246; F01D 25/243; F16B 43/001; F16B 37/14;
(Continued)

(56) References Cited

U.S. PATENT DOCUMENTS

| 6,758,646 B1 * | 7/2004 | Ishida | ..................... F16B 39/10 411/119 |
| 8,529,204 B2 * | 9/2013 | Bagnall | ..................... F02K 3/06 415/218.1 |

(Continued)

FOREIGN PATENT DOCUMENTS

| FR | 2680384 A1 | 2/1993 |
| FR | 3032223 A1 | 8/2016 |
| WO | 2014/152636 A1 | 9/2014 |

OTHER PUBLICATIONS

Preliminary Research Report and Written Opinion received for French Application No. 1855004, dated Feb. 28, 2019, 7 pages (1 page of French Translation Cover Sheet and 6 pages of original document).

*Primary Examiner* — J. Todd Newton
*Assistant Examiner* — Eric J Zamora Alvarez
(74) *Attorney, Agent, or Firm* — Womble Bond Dickinson (US) LLP

(57) ABSTRACT

The invention concerns a part of a turbomachine, including an element having a first aerodynamic surface including a counterbore at the bottom of which is provided a mounting hole of a fastening screw of the part, and a washer configured to be accommodate into the counterbore and intended to serve as a support for a head of the fastening screw, wherein the washer has an asymmetry of revolution about a screwing axis and is engaged by shape complementarity in the counterbore, and in that the washer includes a second aerodynamic surface extending in the continuity of the first surface.

19 Claims, 5 Drawing Sheets

(51) Int. Cl.
*F16B 39/10* (2006.01)
*F01D 25/24* (2006.01)

(52) U.S. Cl.
CPC ........ *F16B 39/108* (2013.01); *F05D 2240/12* (2013.01); *F05D 2240/80* (2013.01); *F05D 2260/31* (2013.01)

(58) Field of Classification Search
CPC .. F16B 39/105; F16B 39/108; F05D 2240/12; F05D 2240/80; F05D 2260/31; F05D 2260/301; F05D 2230/60; F05D 2260/36; F05D 2260/30; F05D 2250/232; F05D 29/542; F02C 7/04; F04D 29/542; Y02T 50/673
See application file for complete search history.

(56) References Cited

U.S. PATENT DOCUMENTS

| 10,502,133 | B2 * | 12/2019 | Awasthi | F02C 7/04 |
| 2015/0345315 | A1 * | 12/2015 | Orieux | F04D 29/542 |
| | | | | 415/211.2 |

* cited by examiner

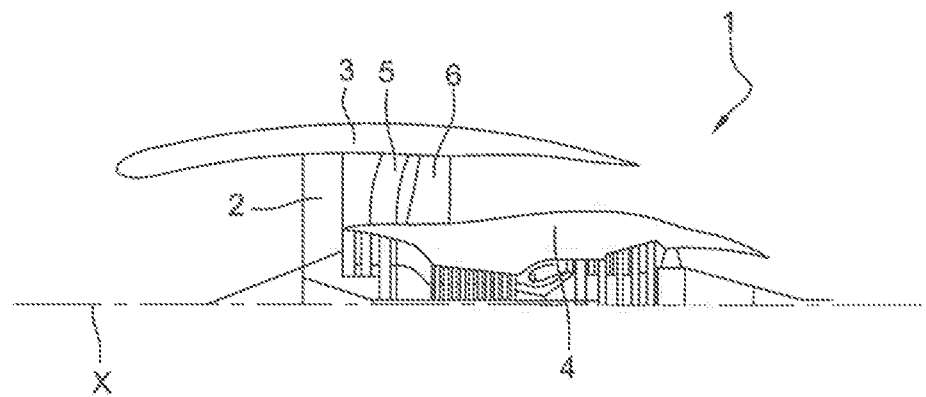
Fig. 1
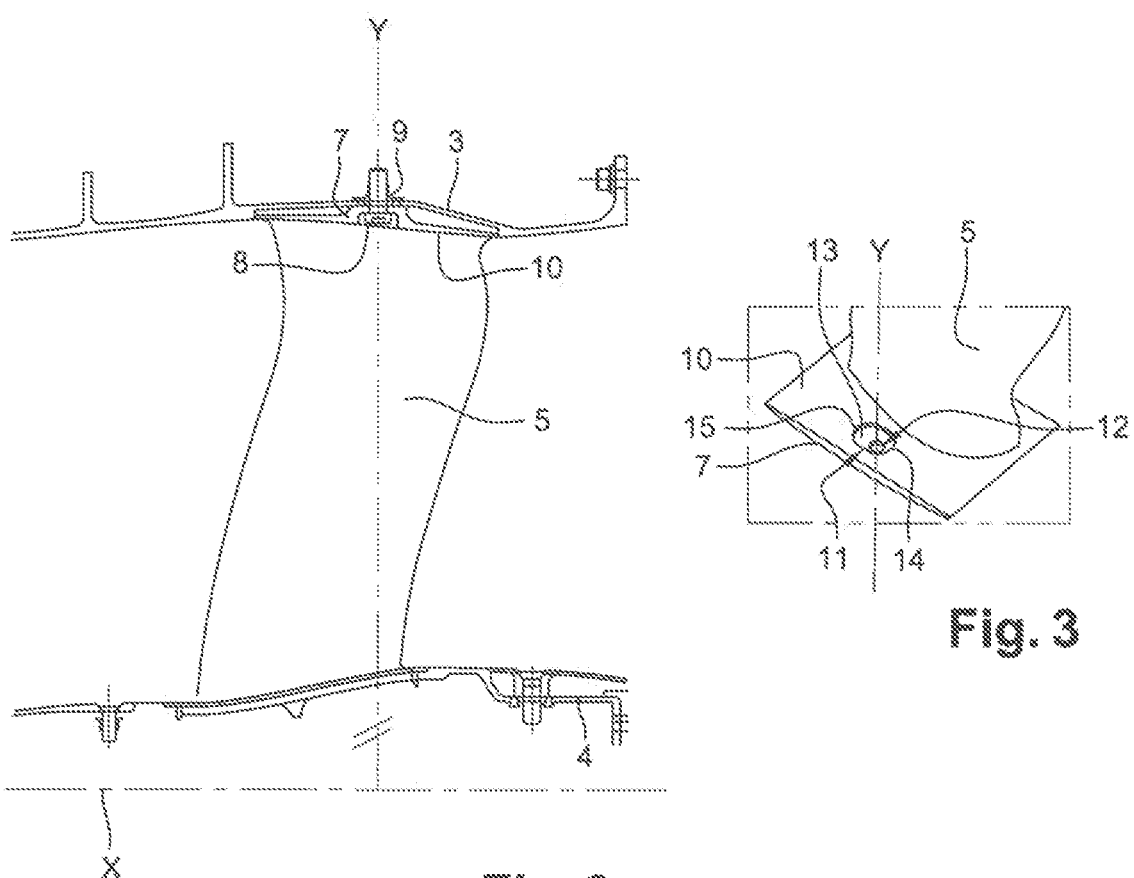
Fig. 2
Fig. 3

PART OF A TURBOMACHINE COMPRISING A WASHER COOPERATING WITH A COUNTERBORE

TECHNICAL FIELD

This invention relates to the field of turbomachines. It concerns more particularly the devices guiding the flows inside the turbomachine.

BACKGROUND ART

The prior art comprises documents FR-A1-2 680 384, WO-A1-2014/152636 and US-A1-2015/345315.

In particular, it is important to smooth as much as possible the walls composing the aerodynamic veins of the gas flow passing through the various stages of the turbomachine, in order to optimize its performance, whereas the realization of these veins requires the assembly of several parts.

Within the secondary vein, for example, the stator vanes can be attached to the fan casing. A vane head then comprises a platform which, when pressed against the casing, forms the wall of the vein in continuity with the latter. In the application under consideration, counterbores are made in the platform at the head of the vane, then washers and flat head screws hold the vane on the casing by inserting it into the counterbore.

Generally, the counterbores are not filled with screws and washers. The assembly then forms asperities for the aerodynamic vein. It is difficult to seal the asperity formed by a cap in the example considered, as the outer wall of the vein is strongly conical. In addition, a cap may present the risk of becoming detached during turbomachine operation.

The purpose of the invention is to provide a simple and safe solution to smooth out the asperities that can be created by screw type fasteners inside the counterbore on aerodynamic surfaces.

DISCLOSURE OF THE INVENTION

The invention concerns a part of a turbomachine, comprising an element having a first aerodynamic surface comprising a counterbore at the bottom of which is provided a mounting hole of a fastening screw of the part, and a washer configured to be accommodate into the counterbore and intended to serve as a support for a head of said fastening screw, characterized in that the washer has an asymmetry of revolution about a screwing axis and is engaged by shape complementarity in said counterbore, and in that the washer comprises a second aerodynamic surface extending in the continuity of said first surface.

The washer holding the fixing screw allows to smooth out the asperities for the flow passing over the aerodynamic surface of said element to be maintained thanks to said second aerodynamic surface. In addition, the fact that the washer is asymmetrical with respect to the mounting hole ensures that it is positioned in the counterbore along its nominal position, designed so that its second aerodynamic surface is in continuity with the first surface.

Advantageously, said washer forms a strut around the screw separating, along a mounting axis of the screw, a first end in support on the bottom of the counterbore and a second end comprising said second surface.

Said first end can in support in a plane that is inclined with respect to said second surface.

According to a preferred embodiment, said washer comprises a disc or fork configured to be tightened by said head against the bottom of the counterbore and a cap which is intended to seal the counterbore and to define said second surface.

Advantageously, said cap comprises a screwing hole of the screw. Preferably, the diameter of the screwing hole is smaller than the diameter of the mounting hole of the screw. This minimizes disturbances on the aerodynamic surface.

According to a second embodiment, said second end of the strut comprises a supporting frustoconical inner surface of the head of the screw. Advantageously the part is full at both ends.

This embodiment is more suitable for cases where the thickness of the counterbore is not enough to carry out the first embodiment. In this case, the two ends of the washer can be made up of two faces of a solid part, without requiring separation between a plate forming the cap and a plate forming the fork.

Advantageously, said washer is made of a single part.

Preferably, said washer has a generally oblong shape.

The part can be a vane, in particular that of a stator vane, which comprises a platform having said first aerodynamic surface.

The part can be an air inlet cone, a cowl or a casing.

The invention also concerns an aircraft turbomachine, comprising a part according to one of the preceding claims.

According to a second variant, the invention concerns a part of a turbomachine comprising an element having a first aerodynamic surface comprising a counterbore at the bottom of which is provided a mounting hole of a fastening screw of the part, and a washer configured to be accommodate into the counterbore and intended to serve as a support to a head of said fastening screw, characterized in that the washer has a circumferential symmetry about a screwing axis and is engaged in said counterbore by shape complementarity, and in that the washer comprises a second aerodynamic surface extending in continuity with said first surface.

In accordance with the second variant of the invention, the screwing axis is perpendicular to the first aerodynamic surface of the part.

The washer of the second variant has the same technical advantages as those described above for the first variant. However, it is no longer the washer that has an asymmetry around the screw axis. The screw axis is drilled so that it is perpendicular to the flow vein, i.e. to the first aerodynamic surface. Thus, the screw axis is inclined with respect to the engine axis. This allow to provide a washerpresenting a symmetry of revolution around the screw axis. Advantageously, the second aerodynamic surface is less bulky and is easy to achieve, while optimizing to smooth out the asperities for the flow passing over the aerodynamic surface of said element to be maintained.

Preferably, said washer has a general circular shape.

BRIEF DESCRIPTION OF THE FIGURES

This invention shall be better understood and other details, characteristics and advantages of this invention shall appear more clearly when reading the following description, with reference to the annexed drawings on which:

FIG. 1 schematically shows a half axial section of a turbomachine concerned by the invention.

FIG. 2 schematically shows a detail from FIG. 1 showing a stator vane of a secondary flow with fixing means according to the prior art.

FIG. 3 shows a perspective view of an element fastener of a fastening part according to the invention for the vane of FIG. 2.

DESCRIPTION OF AN EMBODIMENT OF THE INVENTION

Figure 4:
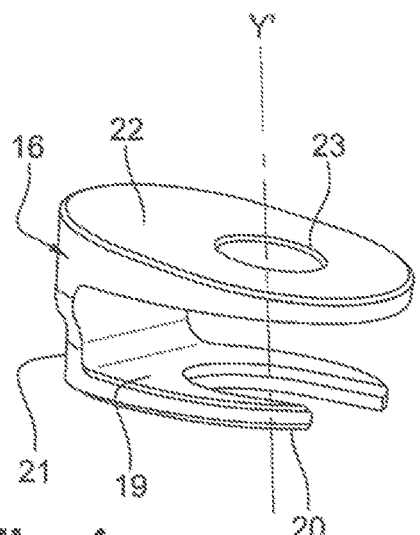
FIG. 4 represents a perspective view of a washer adapted to the element of FIG. 3 for a first embodiment according to a first variant of the invention.

FIG. 1 shows a bypass turbomachine with an engine compartment 1, which is not detailed here, and a fan propeller 2 located upstream. A nacelle 3 careens the fan propeller 2 and partially surrounds the engine compartment 1. It delimits, with an outer casing 4 of the engine compartment, a secondary flow vein driven by the fan propeller 2 that rotates around the engine axis X. An annular row of stator vanes 5 is placed in the secondary flow vein to straighten the secondary flow. A structural arm 6 holding the nacelle 3 on the engine compartment 1 is shown behind the stator vane 5 in the figure.

As shown in FIG. 2, each stator vane 5 of the straightener is fixed by bolting to the outer casing 4 of engine compartment 1 on one side and to the nacelle 3 on the other side. The invention is described here more particularly for the bolting carried out on the nacelle 3. At this location, the head of the vane 5 carries a platform 7 which takes place in a suitable casing of the nacelle 3 and is fixed there by bolting a screw 8 into a thread 9 arranged for this purpose in the wall of the nacelle 3. The axis Y of the screw 8 is substantially radial. The platform 7 comprises, on the radially inner side, an aerodynamic surface 10 that defines the wall of the secondary flow vein around the vane, in continuity with the nacelle upstream and downstream of the platform 7. Said aerodynamic surface 10 is configured to optimize the secondary flow, its shape is not necessarily cylindrical and its curvature is generally not uniform. It is therefore not, in general, perpendicular to the axis Y of the screw 8.

With reference to a first variant of FIG. 3, said aerodynamic surface 10 of platform 7 has a counterbore 11 around the mounting hole 12 for the screw 8 to pass through the platform 7, next to the head of the vane 5. The shape of the counterbore 11 is oblong, elongated in the axial direction X. The bottom 13 of the counterbore 11 is perpendicular to the axis Y of the screw 8. Therefore, the aerodynamic surface 10 is inclined with respect to the bottom 13 of the counterbore 11, here mainly along the axis X of the engine. The aerodynamic surface 10 is therefore closer to the bottom 13 of the counterbore at a first axial end 14 of the oblong shape of the counterbore 11 than at the opposite axial end 15. The hole 12 for the screw 8 to pass through is eccentric in the axial direction with respect to the shape of the counterbore 11. It is close to said first end 14 of the oblong shape. The counterbore depth 11 at the hole 12 is arranged so that the screw 8, when bolted to the nacelle 3, does not emerge from the aerodynamic surface 10.

Figure 5:
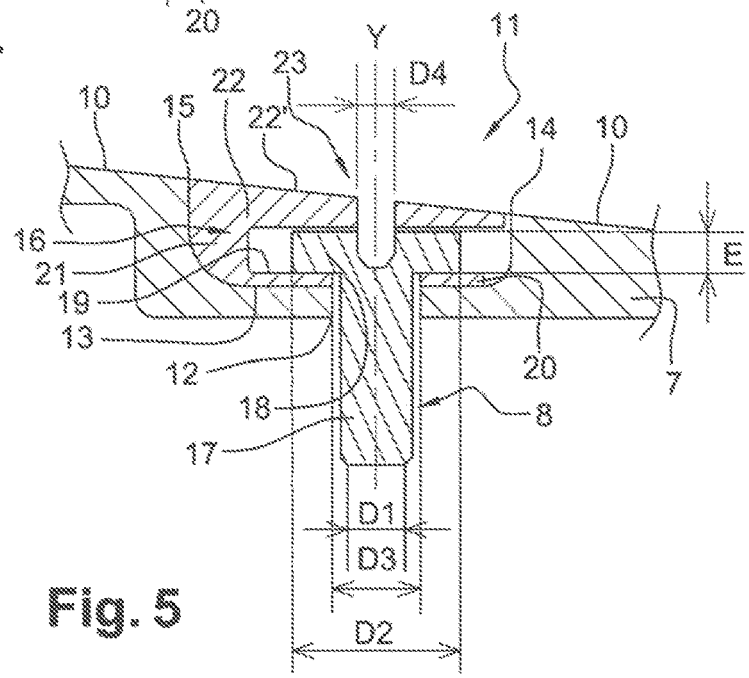
FIG. 5 shows a longitudinal section of the washer of FIG. 4 installed in the element of FIG. 3, with the fixing screw.
Figure 6:
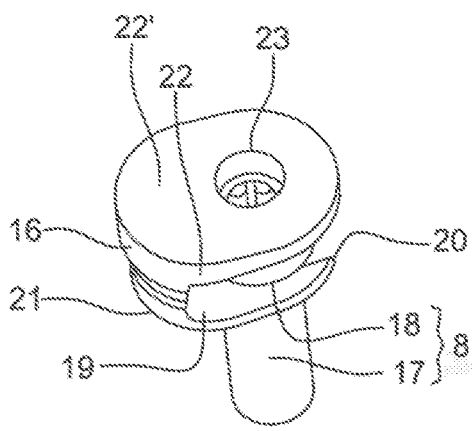
FIG. 6 shows a perspective view of the washer of FIG. 4 with the fixing screw in position.

With reference to FIGS. 4, 5 and 6, a first embodiment of the bolting device associated with counterbore 11 comprises a washer 16 and a screw 8 configured to cooperate.

The screw 8 has a threaded rod 17 with a diameter D1 configured to cooperate by screwing with the thread 9 of the nacelle 3 and a head 18 whose thickness E is significantly less than the depth of the counterbore 11. The head 18 forms a crown whose diameter D2 is smaller than the width of the counterbore 11 to accommodate it but larger than the diameter D3 of the hole 12 to press on an element of the washer 16 when the screw 8 is tightened on the nacelle 3. The head 18 has a pattern on its outer side intended to cooperate with a wrench. Here, the diameter D4 of the pattern is advantageously smaller than the diameter D1 of the rod 17, thus significantly smaller than the diameter D2 of the head 18.

The washer 16 comprises a planar plate 19 conforming to the oblong shape of the bottom 13 of the counterbore 11, with a first end 20 corresponding to the first end 14 of the counterbore and a second end 21 corresponding to the opposite end 15 of the counterbore in its longitudinal direction. Said plate 19 forms a fork with a U-shaped notch extending longitudinally from said first end 20. The bottom of the U-shaped notch provides an hole centered on an axis Y' arranged to correspond to the axis Y of the hole 12 of the counterbore 11. The notch is arranged to allow the rod 17 of the screw 8 when the latter is installed in the hole 12 of the counterbore and its width allows the rod 17 of the screw to slide in perpendicular position to the plate 19.

The second end 21 of the plate 19 comprises a substantially perpendicular return that connects it to a second plate 22 that is shaped to reproduce the shape of the secondary vein at the counterbore 11 and for its outer surface 22' to form an aerodynamic surface in continuity with the aerodynamic surface 10 of platform 7. As shown in FIG. 5, the two plates, 19 and 22, are therefore superimposed and spaced from a transverse space through which the head 18 of the screw 8 can pass when its rod 17 is slid into the notch of the first plate 19.

The washer 16 therefore forms a strut around the screw 8 separating, along the axis Y' for mounting the screw, a first end, corresponding to the surface of the flat plate 22 resting on the bottom 13 of the counterbore 11, and a second end 22', corresponding to the external surface 22' of the second plate 22.

The second plate 22 has a circular opening 23 centered on the position of the hole 12 in the counterbore 11. As shown in FIGS. 5 and 6, the axis of the screw 8 is facing this opening 23 when the screw 8 is in place in the washer 16. This allows the rod to be passed through a wrench adapted to the pattern of the head 18 of the screw 8 to tighten it in the thread 9. Advantageously, the diameter of the opening 23 is limited to the diameter D4 of the pattern on the head 18 of the screw. The diameter of the opening being smaller than the diameter of the hole 12, this optimally limits the disturbances in relation to the aerodynamic surface 22' reproduced by the second plate 22 of the washer 16.

Figure 7:
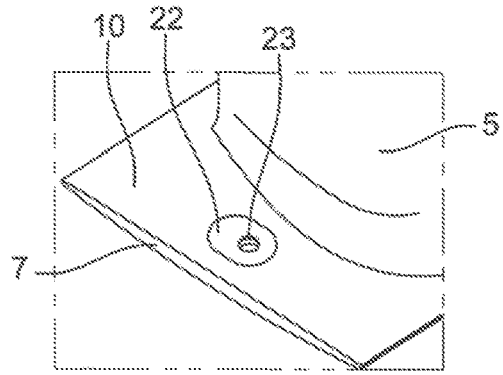
FIG. 7 shows a perspective view of the washer of FIG. 4 installed in the element of FIG. 3, with the fixing screw.

To bolt the vane 5 with this device, the screw 8 is first positioned in the washer 16 by inserting the head 18 into the space between the two plates, 19 and 22, of the washer 16. The rod 17 is also engaged in the U-shaped notch of the first plate 9. The screw 8 is then slid parallel to the first plate 19 along the notch until it is in front of the opening 23 for passing the wrench. Then the rod 17 of the screw is inserted into the hole 12 of the counterbore provided for its mounting. As the screw is tightened in the thread 9, the washer 16 is pushed into the counterbore 11 with the screw 8. With reference to FIG. 7, when the screw 8 is tightened, the outer surface 22' of the second plate 22 of the washer 16 ensures continuity with the aerodynamic surface 10 of the platform 7 and the screw 8 is hidden inside the washer 16. The second plate 22 thus forms a cap for the counterbore 11 and the opening 23 in its aerodynamic surface 22' is the only disturbance of the continuity of this aerodynamic surface.

Figure 8:
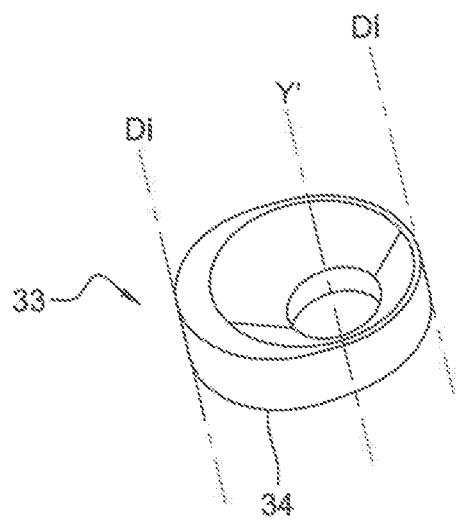
FIG. 8 represents a perspective view of a washer adapted to the element of FIG. 3 for a second embodiment according to a first variant of the invention.
Figure 9:
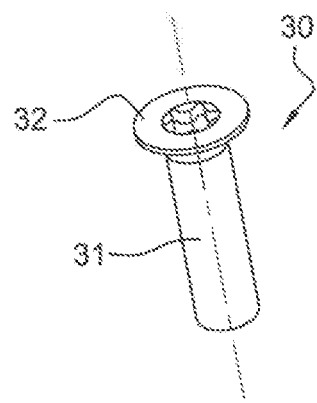
FIG. 9 shows a perspective view of the fixing screw adapted to the washer of FIG. 8.
Figure 10:
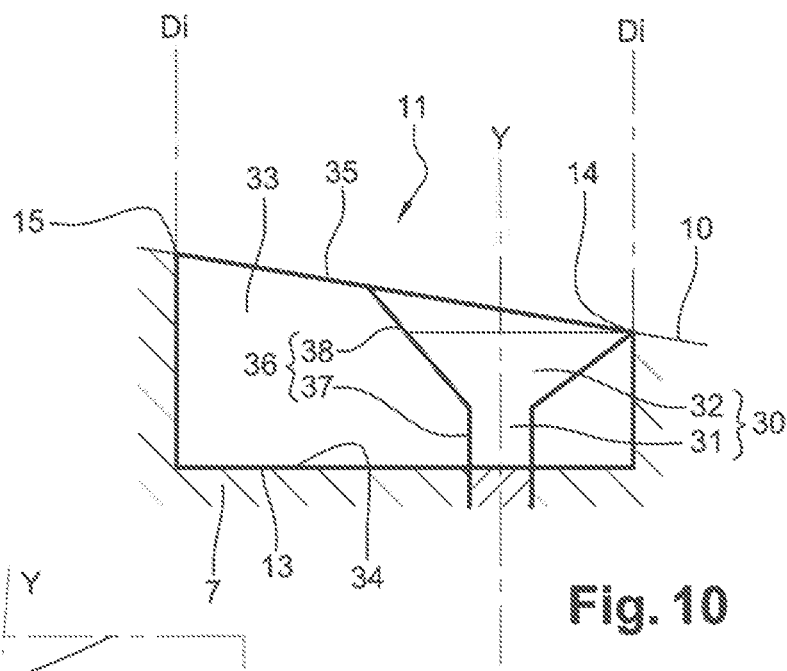
FIG. 10 shows a schematic longitudinal section of the washer of FIG. 8 installed in the element of FIG. 3, with the fixing screw.

With reference to FIGS. 8, 9 and 10, according to a second embodiment, the screw 30 comprises, as previously, a rod 31 of diameter adapted to be bolted into the thread 9 of the nacelle and therefore to pass through the corresponding hole 12 of the counterbore 11. Here, the head 32 of the screw 30 is milled, i.e. it has a conical face from the rod 31 to its outer face which is perpendicular to the axis of the rod 31. As previously, the outer surface of the head 32 comprises a pattern configured to cooperate with a wrench.

The washer 33 is here a solid part cut in a cylinder generated by the oblong shape of the counterbore 11, in order to occupy the volume of the latter. The thickness of the washer 33 corresponds to the thickness of the counterbore 11. A first side 34 of the washer is perpendicular to the generating lines Di of the cylinder and is shaped to fit the bottom 13 of the counterbore 11. As shown in FIG. 10, the generating lines Di are parallel to the axis Y of the hole 12 of the counterbore 11 when the washer 33 is installed in the latter. The second side 35, opposite the first 34 along the lines Di, is shaped to reproduce the wall of the vein in continuity with the aerodynamic surface 10 of the platform 7. The washer 33 therefore has a general shape, perpendicular to the generating Di, which is oblong like the counterbore 11.

An annular passage 36 of circular cross-section about an axis Y' perpendicular to said first side 34 passes through the washer 33 from one side to the other. Said perpendicular axis Y' corresponds to the axis Y of the hole 12 of the counterbore 11 when the washer 33 is installed in the latter. The axis Y' is therefore offset longitudinally with respect to the oblong shape of the washer 33.

This passage 36 comprises a cylindrical section 37, on the side of the first side 34, which has a diameter adapted to allow the rod 31 of the screw 30 to pass through but not its head 32. The passage has a second section 38 corresponding to a conical recess machined in the second side 35 of the washer. The angle of the cone of this recess corresponds to the angle of the cone of the head 32 of the screw 30. In addition, the conicity of the recess 38 and the head 32 of the screw is adapted so that the head 32 of the screw does not come out of the washer 33 when the head 32 of the screw 30 is pressed against the bottom of the recess 38. Ideally, as shown in FIG. 10, in this position, the head 32 of the screw 30 flushes with the surface of the second side 35 on the thinnest side of the washer.

Figure 11:
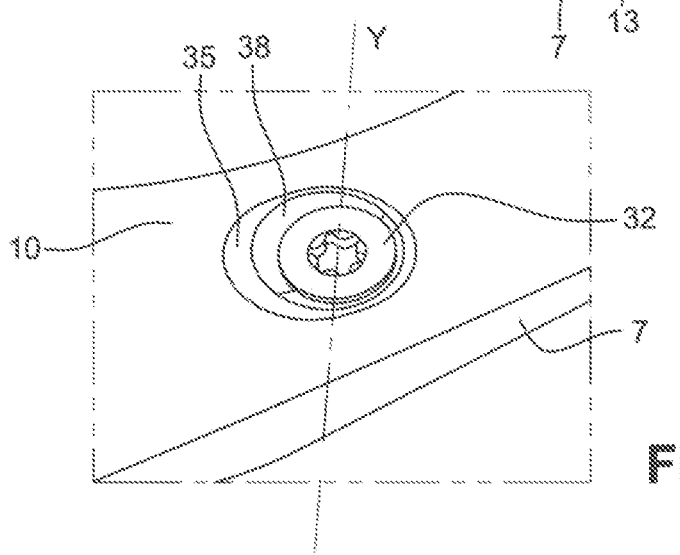
FIG. 11 shows a perspective view of the washer in FIG. 8 installed in the element of FIG. 3, with the fixing screw.
Figure 12:
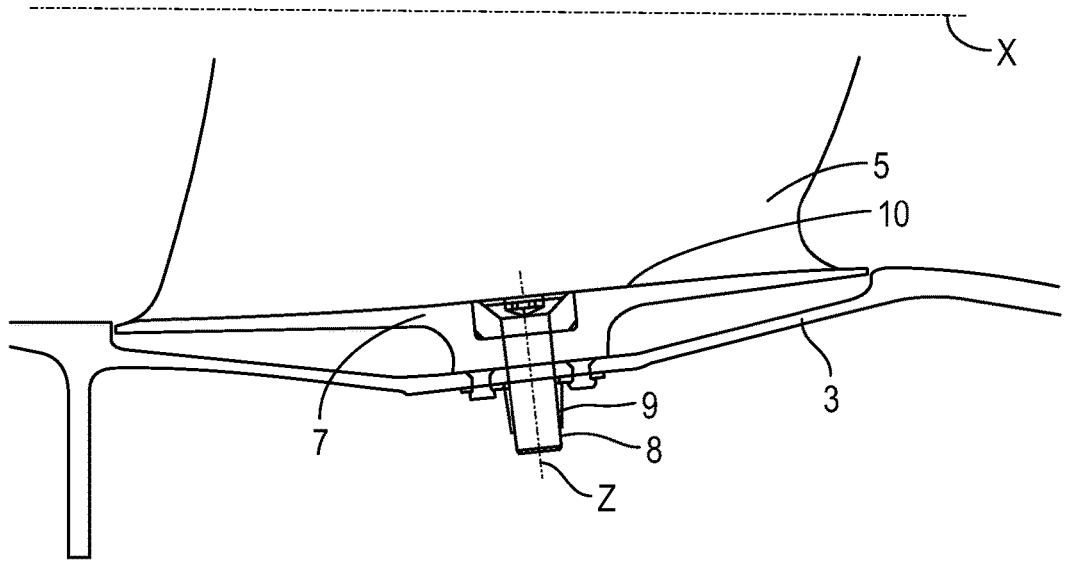
FIG. 12 shows a schematic view in axial and partial section of stator vane of a secondary flow with fixing means according to a second variant of the invention.

To install this device, it is possible to place first the washer 33 in the counterbore 11, then insert the screw 30 in the passage 36 and tighten it in the thread 9 of the nacelle 3. As shown in FIG. 11, the washer 33 seals the counterbore 11, its second side 35 ensuring the continuity with the aerodynamic surface 10 outside the passage 36, leaving just a small depression above the head 32 of the screw in the conical recess 38. This variant requires less thickness than the first embodiment and is more suitable when the radial space requirement is reduced.

Figure 15:
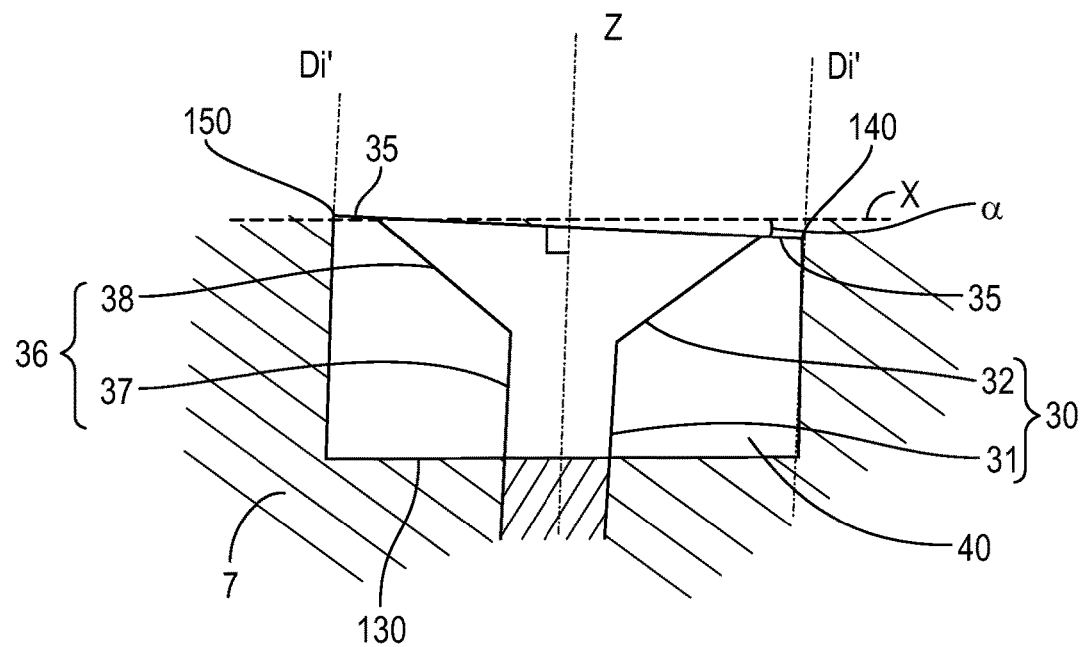
FIG. 15 shows a longitudinal section of the washer of FIG. 14 installed in the element of FIG. 13, with the fixing screw.

A second variant of embodiment is illustrated in FIGS. 12 to 17. This second variant differs from the first variant in particular by an axis Z of the screw 30 which is substantially perpendicular to the aerodynamic surface 10 defining the wall of the secondary flow vein around the vane 5. This aerodynamic surface 10 is therefore slightly inclined at an angle α with respect to the axis X of the engine. The angle of inclination a can be between 0 and 15°, in particular between 5 and 10°. FIG. 15 shows the axis of inclination of approximately 6° with respect to the axis X of the engine. The axis Z of screwing is also inclined with respect to the axis X of the engine.

Figure 13:
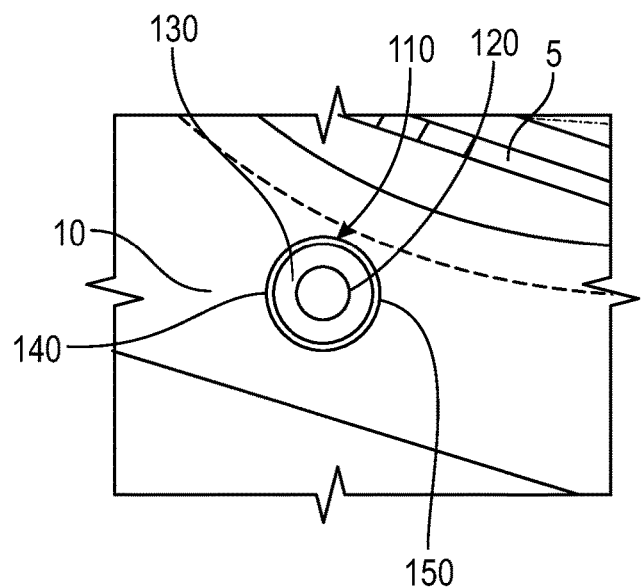
FIG. 13 shows a perspective view of a fastener element according to the second variant for the vane of FIG. 12.
Figure 14:
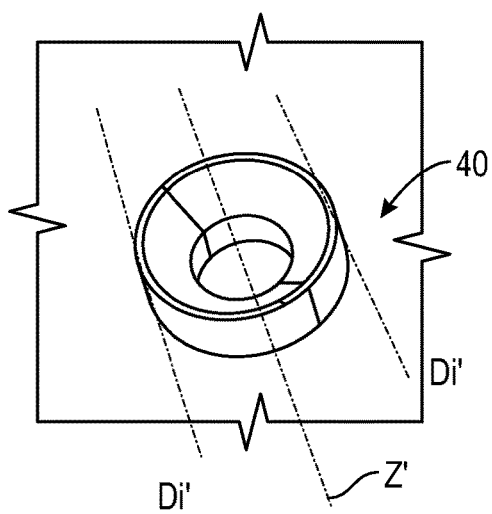
FIG. 14 shows a perspective view of a washer adapted to the element of FIG. 13.

With reference to FIG. 13, the counterbore 110 of the aerodynamic surface 10 is circular or annular in shape. The bottom 130 of the counterbore 110 is also perpendicular to the axis Z of the screw 30. Thus, the bottom 130 is substantially parallel to the aerodynamic surface 10 of the platform 7. The aerodynamic surface 10 is equidistant at the first 140 and second 150 axial ends of the bottom 130 of the counterbore which are of the circular shape of the counterbore 110. The hole 120 for the screw 30 to pass through is therefore centered on the counterbore 110. The depth of the counterbore 110 at the hole 120 is arranged so that the screw 30, when bolted to the nacelle 3, does not emerge from the aerodynamic surface 10.

With reference to FIGS. 14 to 17, the bolting device associated with the counterbore 110 comprises a washer 40 and a screw 30 configured to cooperate by screwing with the thread 9 of the nacelle 3.

The screw 30 described in reference to FIG. 9 can be screwed into the hole 120 of this second embodiment variant.

The washer 40 can be a full part cut from a cylinder generated by the circular shape of the counterbore 110, in order to occupy the volume of the latter. The thickness of the washer 40 corresponds to the thickness of the counterbore 110. The first side 340 of the washer is perpendicular to the generating lines Di' of the cylinder and is shaped to fit the bottom 130 of the counterbore 110. As shown in FIG. 15, the generating lines Di' are parallel to the axis Z of the hole 120 of the counterbore 110 when the washer 40 is installed in the latter. The second side 350, opposite the first 340 along the lines Di', is shaped to reproduce the wall of the vein in continuity with the aerodynamic surface 10. The washer 40 therefore has a general shape, perpendicular to the generating Di', which is circular like the counterbore 110.

An annular passage 36 of circular cross-section about an axis Z' perpendicular to said second side 35 passes through the washer 40 from one side to the other. Said perpendicular axis Z' corresponds to the axis Z of the hole 120 of the counterbore 110 when the washer 40 is installed in the latter. The axis Z' is therefore centered longitudinally with respect to the circular shape of the washer 40.

This passage 36 is similar to the annular passage 36 described in reference to FIG. 10 of the first variant. The passage 36 therefore comprises a cylindrical section 37, on the side of the first side 340, which has a diameter adapted to allow the rod 31 of screw 30 to pass through but not its head 32. The passage comprises a second section 38 corresponding to a conical recess machined in the second side 350 of the washer 40. The angle of the cone of this recess corresponds to the angle of the cone of the head 32 of the screw 30. In addition, the conicity of the recess 38 and the screw head 32 is adapted so that the screw head 32 does not come out of the washer 33 when the head 32 of the screw 30 is pressed against the bottom of the recess 38. Ideally, as shown in FIG. 15, in this position, the head 32 of the screw 30 flushes with the surface of the second side 35 on the thinnest side of the washer.

Figures 16, 17:
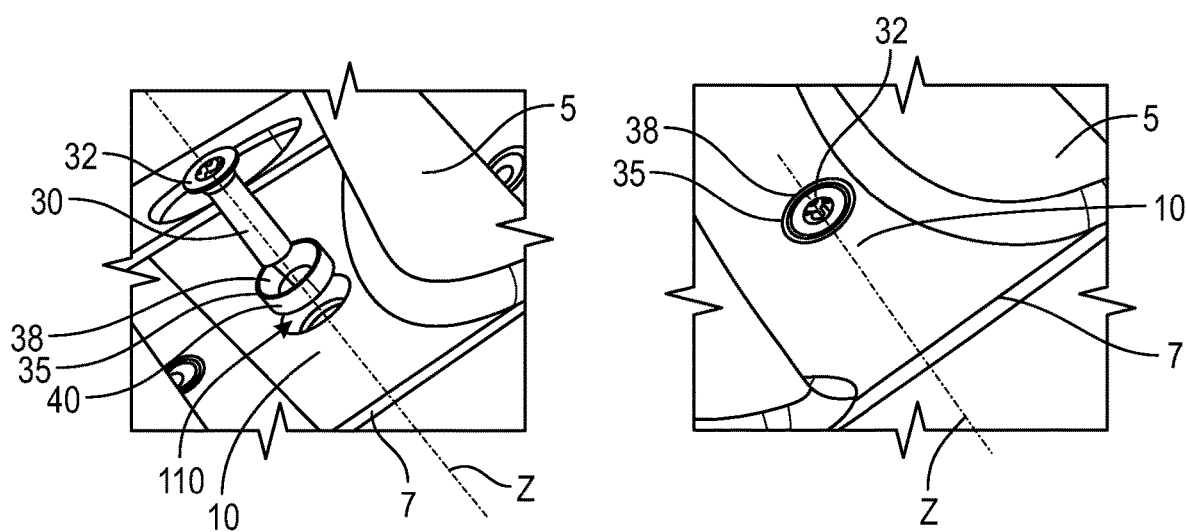
FIGS. 16 and 17 represent a perspective view of the washer in FIG. 14, respectively, during and after its assembly into the element of FIG. 13, with the fixing screw.

With reference to FIG. 16, to install this device, it is first possible to place the washer 40 in the counterbore 110, then insert the screw 30 in the passage 360 and tighten it in the thread 9 of the nacelle 3. As shown in FIG. 17, the washer 40 caps the counterbore 110, its second side 350 ensuring the continuity with the aerodynamic surface 10 outside the passage 36, leaving just a small depression above the head 32 of the screw in the conical recess 38. This variant requires less space and is easier to machine than the embodiments of the first variant.

This invention is not limited to the bolting of the stator vane 5 of the straightener on the casing 4 and nacelle 3. This invention also applies to the bolting of other structures of the turbomachine, in particular those involved in the channeling of an air flow into or out of the turbomachine. Such as the bolting used to fix the fan vanes mounted on the internal discs of the fan 2 or a row of rotor vanes whose radially inner ends can be fixed on a disc carried by a turbomachine shaft or the general structural casing of the nacelle 3.

The invention claimed is:

1. A part of a turbomachine comprising:
   an element having a first aerodynamic surface and comprising a counterbore, said counterbore comprising an upper end and a bottom end, said upper end opening on said first aerodynamic surface and said bottom end forming a mounting hole,
   a fastening screw having a head and a threaded rod, said head being received into said upper end and said threaded rod passing through said mounting hole, said fastening screw having a screwing axis which extends in a first direction, and
   a washer accommodated into said upper end of said counterbore and forming a support for said head of said fastening screw, said washer having a first cross sectional oblong shape in a plane perpendicular to said screwing axis and said upper end of the counterbore having a second cross sectional oblong shape in a plane perpendicular to said screwing axis, said first and second cross sectional oblong shapes being complementary, and said washer having a second aerodynamic surface which is aligned with said first aerodynamic surface, and
   wherein said washer is asymmetric about said screwing axis,
   said washer forms a strut around the fastening screw separating, along a mounting axis of the fastening screw, a first end on the bottom end of the counterbore and a second end comprising said second aerodynamic surface,
   the first and second ends of the washer are interconnected on a first side of the washer,
   the first and second ends of the washer are separated from each other on a second side of the washer which is opposite to the first side, and
   the first and second sides extend in the first direction.

2. The part according to claim 1, wherein said first end is along a plane that is inclined with respect to said second aerodynamic surface.

3. The part according claim 1, wherein said washer comprises a disc or fork configured to be tightened by said head against the bottom end of the counterbore and a cap for sealing the counterbore and to define said second aerodynamic surface.

4. The part according claim 3, wherein said cap comprises a screwing hole for the fastening screw.

5. The part according to claim 4, wherein a diameter of said screwing hole is smaller than a diameter of the mounting hole for the fastening screw.

6. The part according to claim 1, wherein said second end of the strut comprises a supporting frustoconical inner surface for the head of the fastening screw.

7. The part according to claim 1, wherein said washer is formed of a single part.

8. The part according to claim 1, wherein said part is a vane which comprises a platform having said first aerodynamic surface.

9. The part according to claim 8, wherein said part is a stator vane.

10. The part according to claim 1, wherein the part is one of an air inlet cone, a cowl and a casing.

11. An aircraft turbomachine, comprising the part according to claim 1.

12. The part according to claim 1, wherein the mounting hole of said bottom end is eccentric such that the screwing axis of the mounting hole is closer to a first axial end of the washer than to a second opposite axial end of the washer.

13. The part according to claim 1, wherein the first end is a planar plate of the washer conforming to a shape of the bottom of the counterbore, and the second end of the washer is a second plate that is shaped to correspond to the second aerodynamic surface.

14. The part according to claim 13, wherein the planar plate forms a fork with a U-shaped notch extending longitudinally from a first axial end of the washer.

15. The part according to claim 14, wherein the U-shaped notch comprises a bottom having a hole centered to correspond to the mounting hole of said bottom end.

16. The part according to claim 1, wherein the second oblong shape of said upper end is elongated in a second direction, wherein the second direction is perpendicular to the first direction.

17. The part according to claim 1, wherein the washer has an axis which is aligned with the screwing axis.

18. A part of a turbomachine comprising:
   an element having a first aerodynamic surface and comprising a counterbore, said counterbore comprising an upper end and a bottom end, said upper end opening on said first aerodynamic surface and said bottom end forming a mounting hole,
   a fastening screw having a head and a threaded rod, said head being received into said upper end and said threaded rod passing through said mounting hole, said fastening screw having a screwing axis which extends in a first direction, and
   a washer accommodated into said upper end of said counterbore and forming a support for said head of said fastening screw, said washer having a first cross sectional oblong shape in a plane perpendicular to said screwing axis and said upper end of the counterbore having a second cross sectional oblong shape in a plane perpendicular to said screwing axis, said first and second cross sectional oblong shapes being complementary, and said washer having a second aerodynamic surface which is aligned with said first aerodynamic surface, and wherein said washer is asymmetric about said screwing axis, said washer forms a strut around the fastening screw separating, along a mounting axis of the fastening screw, a first end on the bottom end of the counterbore and a second end comprising said second aerodynamic surface, and wherein said second end of the strut comprises a supporting frustoconical inner surface for the head of the fastening screw.

19. An aircraft turbomachine, comprising a part according to claim 18.

* * * * *